Dec. 19, 1939.  E. C. HOMAN  2,183,811

ELECTRICAL INSULATION MATERIAL

Filed Sept. 20, 1938

INVENTOR.
Edward C. Homan,
BY George D. Richards
ATTORNEY.

Patented Dec. 19, 1939

2,183,811

UNITED STATES PATENT OFFICE 2,183,811

ELECTRICAL INSULATION MATERIAL

Edward C. Homan, East Orange, N. J., assignor to Irvington Varnish & Insulator Co., Irvington, N. J., a corporation of New Jersey Application September 20, 1938, Serial No. 230,822

3 Claims. (Cl. 154—2.6)

This invention relates to an improved electrical insulation material in sheet form which is both fireproof and waterproof; and the invention further relates to a novel method of producing the novel sheet insulation material so characterized.

The invention has for an object to provide an improved electrical insulation and method of producing the same, whereby such insulation is of flexible sheet form which, in its finished commercial condition, is ready for use for application as an insulating and protective covering upon exposed electrical conductors, such, e. g., as bus bars and the like; said novel insulation being adapted to be folded and wrapped around the conductor, to be served and protected thereby, so as to overlap the free marginal portions of the insulation sheet, whereby said marginal portions may thereupon be adherently joined and sealed together by application of heat and pressure to form the closing seam of the wrapped insulation.

The invention has for a further object to provide a flexible sheet insulation material for the purposes mentioned, which comprises a fabric base impregnated with a solution of a novel compound adapted to render the threads of the fabric both moisture resistant and adherent to a finish coat or skin of a novel fireproof and waterproof thermoplastic insulation compound which is applied to at least one face thereof.

Other objects of this invention, not at this time more particularly enumerated, will be understood from the following detailed description of the same.

Figure 1:
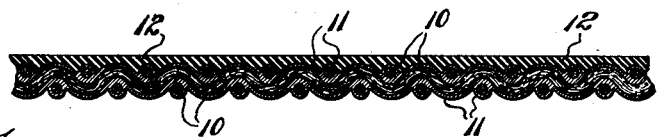
Figure 2:
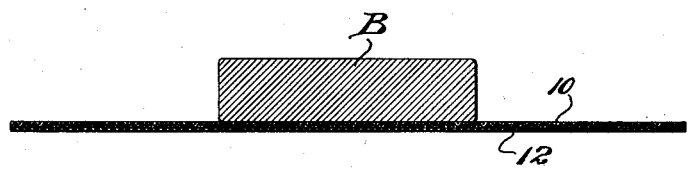
Figure 3:
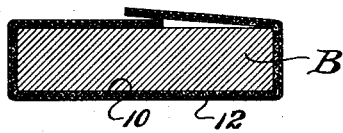
Figure 4:
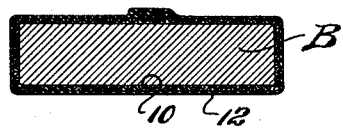

A schematic illustration of the novel insulation material and the manner in which it may be applied in covering relation to a bus bar, or like exposed conductor, is shown in the accompanying drawing, in which:

Fig. 1 is a fragmentary schematic sectional view of the finished insulation material according to this invention; and Figs. 2 to 4 inclusive show the steps in the operation of applying and securing the novel insulation material in covering or enveloping relation to a bus bar or the like.

The novel insulation material according to this invention is produced as follows:

A fabric of suitable width is utilized as the base of the novel insulation material, the same being indicated in Fig. 1 of the drawing by the reference character 10. Preferably an asbestos cloth is employed, although other fabrics, such, e. g., as canvas or duck of suitable weight may be employed. Using asbestos cloth for the base fabric, as a first step in the production of the insulation material, this asbestos cloth is immersed in a solution of a compound adapted to impregnate the same so as to render the threads thereof moisture resistant, and fire resistant if desired, while at the same time so coating said threads as to render the asbestos cloth subject to strong adhesion thereto of a finishing coating of insulating compound of the kind hereinafter set forth.

The impregnating solution for application to the asbestos cloth comprises a mixture of copolymerized vinyl chloride and vinyl acetate with tricresyl phosphate and a small quantity of lead stearate, the mixture being brought into solution by solvents such as acetone and toluol. The relative proportions of the ingredients named are subject to considerable variation, according to the degree of flexibility desired to be maintained in the treated cloth. An illustrative formula which provides a solution of satisfactory effect, is the following:

| | Per cent |
|---|---|
| Copolymerized vinyl chloride and vinyl acetate | 25 |
| Tricresyl phosphate | 25 |
| Lead stearate | 2 |
| Acetone | 30 |
| Toluol | 18 |

If color is desired, dyestuff may be added to the above solution, usually to an amount of about 1 per cent.

The asbestos cloth is immersed by suitably passing the same through a bath composed of the above-described solution. As the asbestos cloth emerges from this bath, the excess solution is removed by suitably applied doctor blades or rods, while the remaining solution impregnated the weave of the cloth in such manner as to surround and cover the threads thereof with a coating of said primary solution.

After the asbestos cloth is thus impregnated, the same is thoroughly dried, until the solvent of the coating is entirely driven off. The drying is best attained by introducing the impregnated cloth into a suitable drying chamber or oven wherein it is subjected to a temperature of approximately 300 degrees F. This drying is carried on for a sufficiently long period of time to assure evaporation of the volatile solvents so that all traces thereof are expelled from the cloth, leaving merely a coating or deposit 11 (see Fig. 1) of the mixture of copolymerized vinyl chloride and vinyl acetate with tricresyl phosphate and lead stearate upon and around the threads of the asbestos fabric.

The impregnated asbestos cloth is now ready to be surfaced with a fireproof and waterproof adherent skin or film of high electrical resistance or insulating effect. The composition employed for this purpose is a resinous compound comprising a mixture of copolymerized vinyl chloride and vinyl acetate, tricresyl phosphate, chloride diphenyl, lead oxide and a filler material such as barium sulphate. This composition forms a thermoplastic mass capable of being calendered or frictioned upon the surface of the impregnated asbestos cloth. The relative proportions of the ingredients forming this resinous compound are also subject to considerable variation, according to the degree of flexibility desired with respect thereto. An illustrative formula, which provides a composition of satisfactory effect, is the following:

| | Per cent |
|---|---|
| Copolymerized vinyl chloride and vinyl acetate | 40 |
| Tricresyl phosphate | 26 |
| Chlorinated diphenyl | 13 |
| Lead oxide | 2 |
| Barium sulphate | 19 |

The skin or film of surfacing composition aforesaid is calendered or skimmed onto a face of the prepared impregnated asbestos cloth, so as to provide a uniform coating 12 (see Fig. 1) which works into the surface interstices of the weave of the cloth and which firmly adhesively anchors itself to the threads of the cloth owing to the affinity between the composition 12 and the coating 11 on the threads of impregnated cloth. The resultant external skin or film of the composition 12 constitutes a strong, elastic and uniformly dense and tough insulating medium entirely free from voids, while at the same time, by reason of its ingredients, providing a skin or film which is moisture resistant to a high degree as well as fireproof or non-flammable. The skin or film when cooled to hardened condition is of smooth pleasing appearance and is not tacky, although thermoplastic.

The novel sheet insulating material made as above described, and possessing the desirable characteristics set forth, is especially adapted for use as an applied covering over exposed electrical conductors, such, e. g., as bus bars and the like, being not only capable of quick and easy attachment thereto, but also furnishing a highly efficient protection against electrical shock, thermal burns, short circuits, etc., while also shielding the bus bar surfaces from corroding contact with surrounding air or gases.

Referring to Figs. 2 to 4 inclusive, the method of applying the novel sheet insulating material to a bus bar is indicated. In said figures of the drawing, the bus bar is shown in cross section and is indicated by the reference character B.

Preparatory to application of the sheet insulating material to the bus bar B, a piece of the insulating material of suitable length and width is cut, and thereupon laid, coated face down, upon a suitable surface, such as a work bench top, whereupon the bus bar B is placed upon the same to extend centrally along the length thereof (see Fig. 2). The free longitudinal marginal portion along one side of the insulation sheet is thereupon turned upward along the adjacent edge of the bus bar and then inwardly over the upper face thereof, whereupon the opposite free longitudinal marginal portion of the insulation sheet is likewise turned upward along the opposite edge of the bus bar and then inwardly over the upper face of the latter so as to overlap said first mentioned marginal portion of said insulation sheet (see Fig. 3). The lapped sections of the sheet are now fused together by applying heat and pressure thereto, as, e. g., by pressing or ironing down the same with an electrically or otherwise heated flat iron. Owing to the thermoplastic nature of the composition providing the skin or film 12 of said sheet insulation, when the same is subjected to heat and pressure along said lapped sections of the sheet it will soften and weld itself to the impregnating coating of the adjacent threads of base fabric so as to amalgamate therewith and thus strongly join the laps in adhesively secured relation, whereby a closed seam free from gaps or voids is formed (see Fig. 4). In this manner the insulating wrapping is securely held in applied enveloping relation to the bus bar, so as to provide the latter with a very durable and highly efficient covering possessing great electrical, mechanical and chemical resistance, while at the same time being both fireproof and waterproof.

As compared with heretofore employed varnished asbestos tape applied to the bus bar by winding the same thereabout, the novel sheet insulation of the instant invention is not only capable of application with greater ease and with expenditure of less labor and time, but, by reason of its composition, provides a much more efficient protective material in every respect. This is shown by the results of comparative tests herebelow given, viz:

| | Instant sheet insulation | Varnished asbestos tape |
|---|---|---|
| Tensile strength as to warp | 190 pounds | 75 pounds. |
| Tensile strength as to composition | 153 pounds | 62 pounds. |
| Permeability to water vapor | 0% in 24 hours | 100% in 24 hours. |
| Electrical resistance | 15,000 volts average. 20,000 volts maximum. 12,000 volts minimum. | 600 volts maximum. 0 volts minimum. |

Having described my invention, I claim:

1. Bus bar insulation comprising an enveloping sheet of fabric coated with waterproofing material and faced on its external side with an adhered layer of flexible thermoplastic electrical insulating compound of high fire and water proof characteristics comprising 40 percent copolymerized vinyl chloride and vinyl acetate, 26 percent tricresyl phosphate, 13 percent chlorinated diphenyl, 19 percent filler material and 2 percent lead oxide as a stabilizing agent, these ingredients in such proportions being adapted to become adhesively tacky under applied pressure and heat upwards of 250 degrees F. but which will remain set and non-dripping under bus bar operating temperature, said sheet having overlapped meeting marginal portions bonded together by said compound.

2. Flexible sheet insulation adapted for folding around bus bars and like electrical current carriers in enveloping relation thereto and secured by adhesion together of its overlapped meeting portions when so folded, comprising a base fabric coated with a mixture of copolymerized vinyl chloride and vinyl acetate with tricresyl phosphate and a small percentage of lead stearate as a stabilizing agent thereby to render the fabric impervious to moisture and to provide a bonding agent for adhering an external facing of thermoplastic electrical insulating compound thereto, and a flexible thermoplastic electrical insulating compound of high fire and water proof characteristics adhered to the outer face of said base fabric, said compound comprising 40 percent copolymerized vinyl chloride and vinyl acetate, 26 percent tricresyl phosphate, 13 percent chlorinated diphenyl, 19 percent barium sulphate as a filler material and 2 percent lead oxide as a stabilizing agent, whereby said compound will become adhesively tacky under applied pressure and heat upwards of 250 degrees F. but will remain set and non-dripping under temperatures up to 200 degrees F. more or less.

3. Flexible sheet insulation as defined in claim 2, wherein the fabric moisture proofing coating consists of approximately equal parts of copolymerized vinyl chloride with vinyl acetate and of tricresyl phosphate with an added small percentage of lead stearate as a stabilizer.

EDWARD C. HOMAN.